United States Patent
Cheu et al.

(10) Patent No.: US 7,564,747 B2
(45) Date of Patent: Jul. 21, 2009

(54) METHOD FOR DETERMINING A COMPENSATION VALUE FOR TRACKING ERROR SIGNAL

(75) Inventors: Shih-Chang Cheu, Taipei (TW); Chih-Ming Lai, Taipei (TW); Po-Chen Huang, Taipei (TW); Chih-Chung Chiao, Taipei (TW)

(73) Assignee: Lite-On It Corporation, Taipei (TW)

( * ) Notice: Subject to any disclaimer, the term of this patent is extended or adjusted under 35 U.S.C. 154(b) by 652 days.

(21) Appl. No.: 11/153,477

(22) Filed: Jun. 16, 2005

(65) Prior Publication Data
US 2005/0281150 A1    Dec. 22, 2005

(30) Foreign Application Priority Data
Jun. 16, 2004    (TW)    ............... 93117388 A

(51) Int. Cl.
*G11B 7/00*    (2006.01)
(52) U.S. Cl. ................. 369/44.32; 369/53.13
(58) Field of Classification Search ......... None
See application file for complete search history.

(56) References Cited

U.S. PATENT DOCUMENTS 6,963,520 B1 * 11/2005 Park et al. ............... 369/44.11
7,315,499 B2 * 1/2008 Kimura et al. ............ 369/53.19

\* cited by examiner

*Primary Examiner*—Joseph Feild
*Assistant Examiner*—Joseph Haley
(74) *Attorney, Agent, or Firm*—Bacon & Thomas, PLLC

(57) ABSTRACT

A method for determining a compensation value for tracking error signal in an optical disc drive is disclosed. The optical disc drive rotates a DVD to read data. The DVD has a first reflection layer and a second reflection layer. The first and the second reflection layers have respectively a number of circles of first and second tracks. First, read data on two first and two second tracks and accordingly generate two first compensation values for tracking error signal and two second compensation values for tracking error signal. Next, determine the third compensation value for tracking error signal corresponding to each of the other first tracks according to two of the first compensation values for tracking error signal. Then, determine the forth compensation value for tracking error signal corresponding to each of the other second tracks according to two of the second compensation values for tracking error signal.

13 Claims, 8 Drawing Sheets

METHOD FOR DETERMINING A COMPENSATION VALUE FOR TRACKING ERROR SIGNAL

This application claims the benefit of Taiwan application Ser. No. 93117388, filed Jun. 16 2004, the subject matter of which is incorporated herein by reference.

BACKGROUND OF THE INVENTION

1. Field of the Invention

The invention relates in general to a method for determining a compensation value for tracking error signal, and more particularly to a method for determining a compensation value for tracking error signal before generating a tracking error signal by differential phase detection (DPD).

2. Description of the Related Art

Nowadays technology is developing very soon, and discs of high storage capacity have become an essential medium carrier for people's daily lives due to widespread application of pictures, music, movies and computer software. The discs, including CD and DVD, are very popular to people due to features of high capacity, small volume and high data security. For this reason, the optical disk drive capable of reading a CD and DVD becomes essential equipment for a personal computer.

In the process of playing a DVD on the conventional optical disc drive, first, place the DVD in the optical disc drive, and rotate it by a spindle motor of the optical disc drive. Next, move an optical pick-up head of the optical disk drive to one side of the rotating DVD. Then, finely adjust a focus servo system of the optical disc drive to perform a focusing operation. Afterwards, finely adjust a tracking servo system of the optical disc drive and generate a tracking error signal by DPD. It should be noted that a compensation value is determined by the optical disc drive to compensate for the practical tracking error signal before the tracking error signal is generated. According to the generated tracking error signal, it can be determined whether the optical disc drive performs a correct tracking operation. As soon as the correct tracking is done, the optical disc drive can reproduce data on DVD.

Referring to FIG. 1A, a partial schematic diagram of a conventional optical disc drive for reading a DVD is shown. The DVD 17 has a first reflection layer 19 and a second reflection layer 20. The optical disc drive includes at least a spindle motor 15 and an optical pick-up head 16. The turntable 15a of the spindle motor 15 is for engaging with the positioning hole 18 at the center of the DVD 17 and the spindle motor 15 can rotate the DVD 17 at a low speed, corresponding to an 8× access speed of the optical disc drive for instance. Moreover, the optical pick-up head 16 has to focus and keep the laser in a track of the first reflection layer 19 or the second reflection layer 20 so as to read data on DVD 17 as the DVD 17 rotating. As shown in FIG. 1C, the first reflection layer 19 and the second reflection layer 20 have respectively a few circles of first tracks and second tracks, such as the first tracks 19a~19f, and the second tracks 20a~20f. The first track 19a and the second track 20a are respectively the innermost tracks of the first reflection layer 19 and the second reflection layer nearest to the positioning hole 18 while the first track 19f and the second track 20f respectively the outermost tracks of the first reflection layer 19 and the second reflection layer farthest to the positioning hole 18.

Referring to FIG. 1B, a flowchart of the conventional method for determining the compensation value for tracking error signal is shown. First, in step 11, respectively read the data on the first track 19a and the second track 20a to perform tracking operation when the optical disc drive rotates the DVD 17 at a low speed. Next, in step 12, respectively generate a first compensation value for tracking error signal and a second compensation value for tracking error signal, such as the values s and v as shown in FIGS. 1D and 1E, by using the optical disc drive. Afterwards, in step 13, respectively use the first compensation value and the second compensation value to be the compensation values for tracking error signal corresponding to the first tracks 19b~19f and the second tracks 20b~20f as the DVD 17 rotating. That is, the first compensation value for tracking error signal is always the value s no matter how fast the disc is rotated while the second compensation value for tracking error signal always the value v no matter how fast the disc is rotated.

However, when the optical disc drive rotates the DVD 17 at a higher speed, corresponding to a 12× data access speed for instance, due to the electrical features of the optical disc drive, the farther the first track departs from the positioning hole 18, the larger the corresponding first compensation value s for tracking error signal becomes. Similarly, the farther the second track departs from the positioning hole 18, the larger the corresponding second compensation value v for tracking error signal becomes. As shown in FIGS. 1D and 1E, the compensation values for tracking error signal corresponding to the first tracks 19a~19f are respectively T1~T6. The value T1 is substantially equal to the value s, but the values T2~T6 are all larger than s. In the same way, the compensation values for tracking error signal corresponding to the second tracks 20a~20f are respectively R1~R6. The value R1 is substantially equal to the value v, but the values R2~R6 are all larger than v. Consequently, the optical disc drive will generate an incorrect tracking error signal according to an incorrect compensation value for tracking error signal, thereby reducing its tracking effect.

SUMMARY OF THE INVENTION

It is therefore an object of the invention to provide a method for determining the compensation value for tracing error signal. Using a numerical method to calculate the compensation value for tracking error signal corresponding to each track of the reflection layers, the optical disc drive can achieve a better tracking effect according to the correct compensation values corresponding to each track at any rotating speed.

The invention achieves the above-identified object by providing a method for determining a compensation value for tracking error signal, applied in an optical disc drive. The optical disc drive rotates a DVD at a speed to read data. The DVD has a first reflection layer and a second reflection layer. The first and the second reflection layers have respectively a number of circles of first tracks and second tracks. First, read data on two first tracks and two second tracks and accordingly generate two first compensation values for tracking error signal and two second compensation values for tracking error signal. Next, determine the third compensation value for tracking error signal corresponding to each of the other first tracks according to two of the first compensation values for tracking error signal and position of each of the other first tracks relative to two of the first tracks. Then, determine the forth compensation value for tracking error signal corresponding to each of the other second tracks according to two of the second compensation values for tracking error signal and position of each of the other second tracks relative to two of the second tracks.

The invention achieves the above-identified object by providing a method for determining a compensation value for tracking error signal, applied in an optical disc drive. The optical disc drive rotates a DVD at a speed to read data. The DVD has a first reflection layer and a second reflection layer. The first reflection layer has M circles of first tracks, and the second reflection layer has Y circles of second tracks. M and N are positive integers. In the method, first, respectively read data on X first tracks and Y second tracks when the optical disc drive rotates the DVD at the speed, and accordingly generate X first compensation values for tracking error signal and Y second compensation values for tracking error signal, wherein X and Y are positive integers larger than 2, and the values X and Y are respectively smaller than M and N. Next, determine a third compensation value for tracking error signal corresponding to each of the other first tracks when the optical disc drive rotates the DVD at the speed according to the X first compensation values for tracking error signal and position of each of the other first tracks. Then, determine a forth compensation value for tracking error signal corresponding to each of the other second tracks when the optical disc drive rotates the DVD at the speed according to the Y second compensation values for tracking error signal and position of each of the other second tracks.

Other objects, features, and advantages of the invention will become apparent from the following detailed description of the preferred but non-limiting embodiments. The following description is made with reference to the accompanying drawings.

DETAILED DESCRIPTION OF THE INVENTION

Embodiment One

Figure 1A:
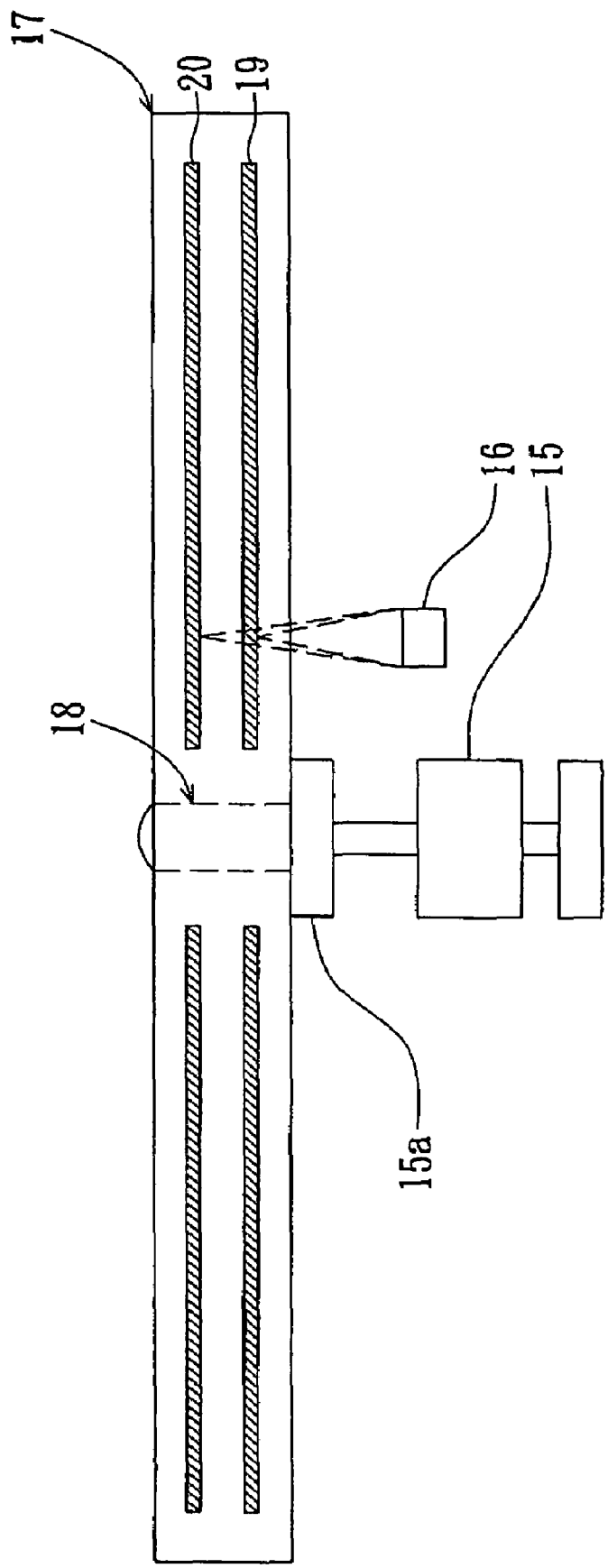
FIG. 1A is a partial schematic diagram of a conventional optical disc drive for reading a DVD.
Figure 1B:
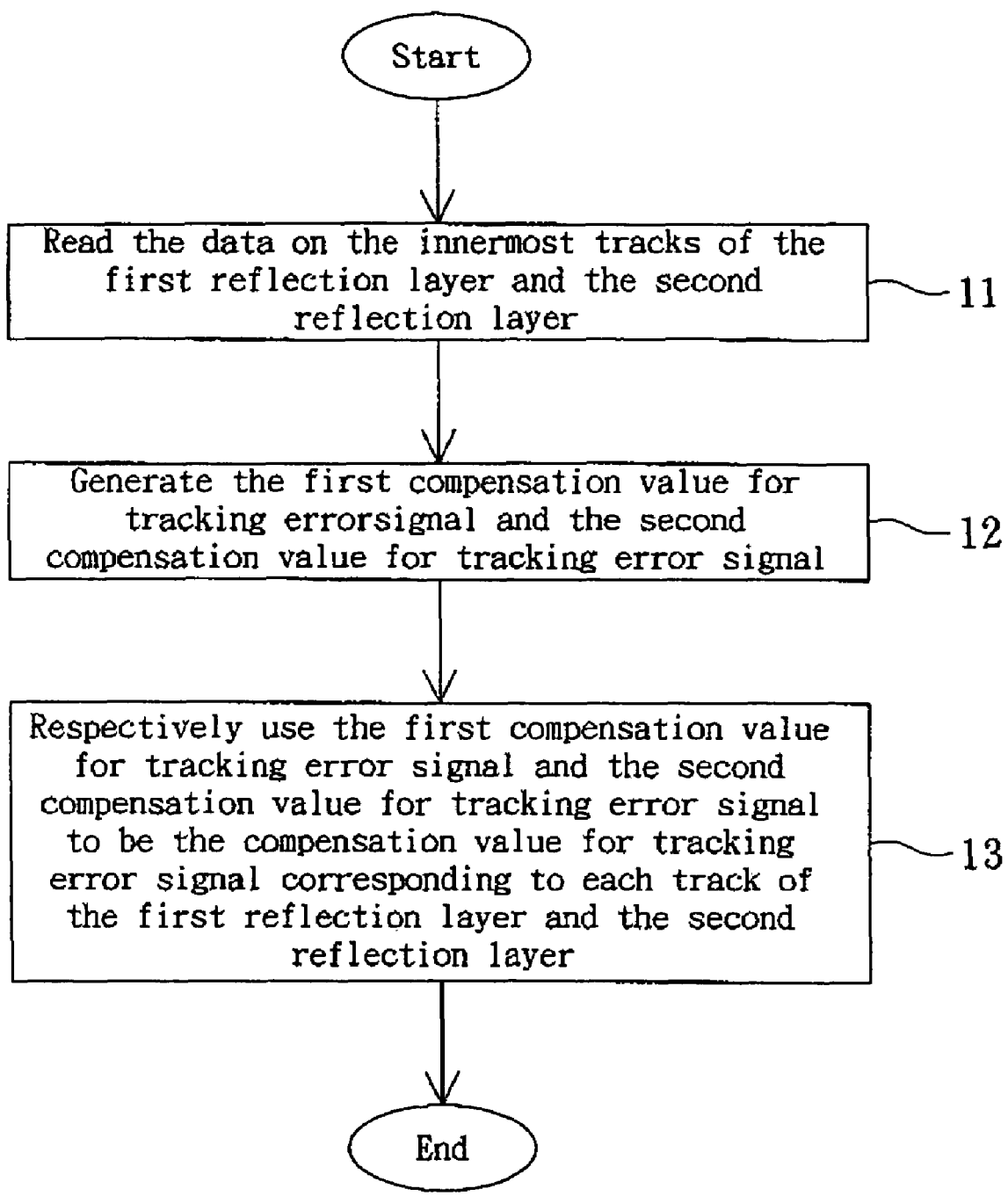
FIG. 1B is a flowchart of the conventional method for determining the compensation value for tracking error signal.
Figure 1C:
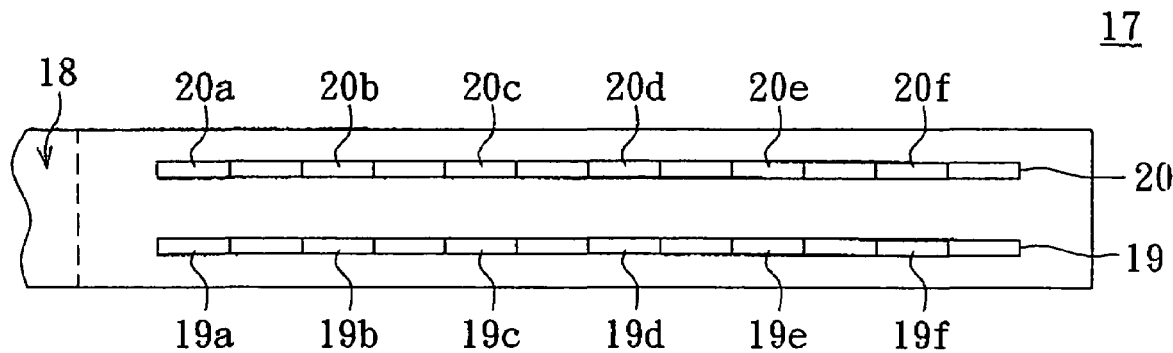
FIG. 1C is a partial cross-sectional view of the DVD in FIG. 1B.
Figure 1D:
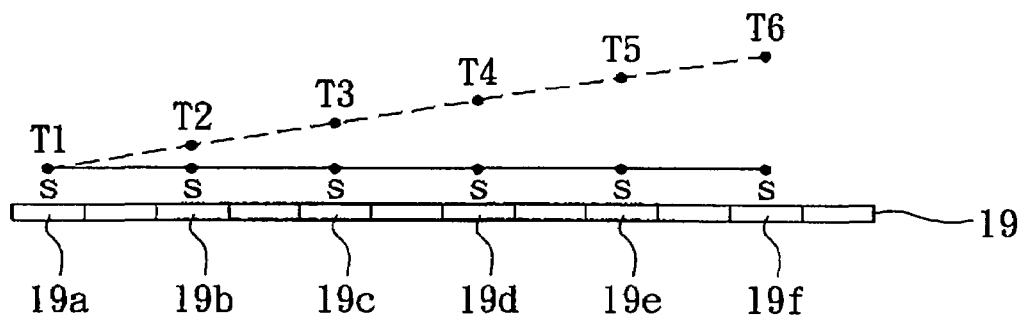
FIG. 1D is a schematic diagram of compensation values for tracking error signal corresponding to the first tracks of the first reflection layer generated in the method of FIG. 1A.
Figure 1E:
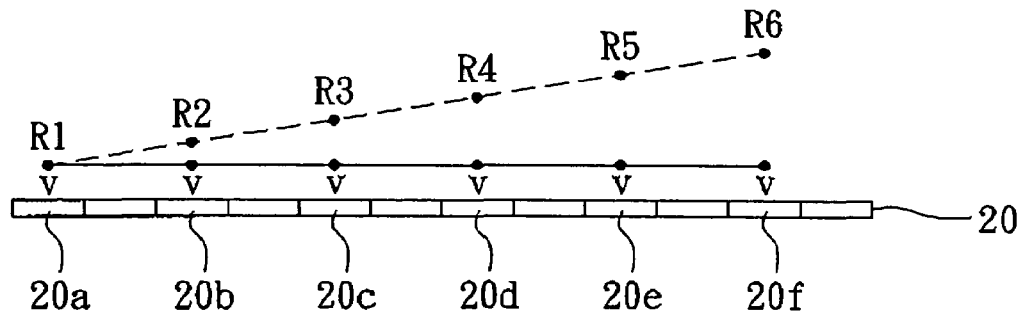
FIG. 1E is a schematic diagram of compensation values for tracking error signal corresponding to the second tracks of the first reflection layer generated in the method of FIG. 1A.
Figure 2A:
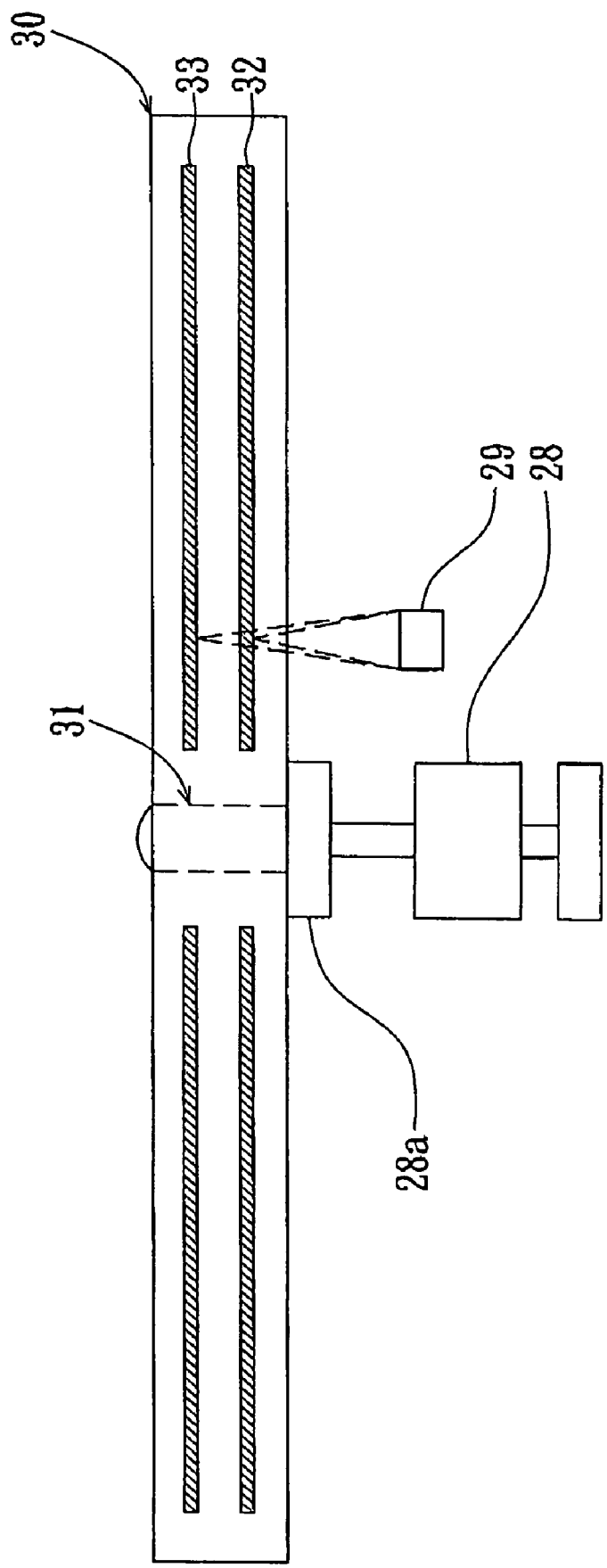
FIG. 2A is a partial schematic diagram of an optical disc drive for reading a DVD according to the first embodiment of the invention.
Figure 2B:
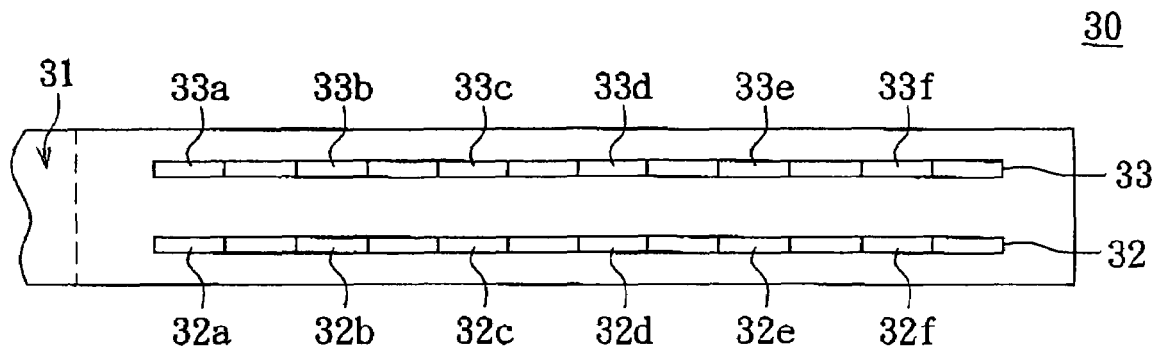
FIG. 2B is a partial cross-sectional view of the DVD in FIG. 2A.

According to the invention, the compensation value for tracking error signal is determined by DPD before the tracking error signal is generated. FIG. 2A is a partial schematic diagram of an optical disc drive for reading a DVD according to the first embodiment of the invention. FIG. 2B is a partial cross-sectional view of the DVD in FIG. 2A. As shown in FIG. 2A and FIG. 2B, the DVD 30 has a first reflection layer 32 and a second reflection layer 33. The optical disc drive includes at least a spindle motor 28 and an optical pick-up head 29. The turntable 28a of the spindle motor 28 is for engaging with the positioning hole 31 at the center of the DVD 30 and the spindle motor 28 can rotate the DVD 30 at a high or low speed. For example, the high speed and the low speed are respectively corresponding to 12× and 8× data access speeds of the optical disc drive. Furthermore, the optical pick-up head 29 has to focus the laser and keep it in a track of the first reflection layer 32 or the second reflection layer 33 so as to read data on DVD 30 as the DVD 30 rotating. As shown in FIG. 2B, the first reflection layer 32 and the second reflection layer 33 have respectively a few circles of first tracks and second tracks, such as the first tracks 32a~32f, and the second tracks 33a~33f. The first track 32a and the second track 33a are respectively the innermost tracks of the first reflection layer 32 and the second reflection layer 33 nearest to the positioning hole 31 while the first track 19f and the second track 20f respectively the outermost tracks of the first reflection layer 32 and the second reflection layer 33 farthest to the positioning hole 31.

Figure 3:
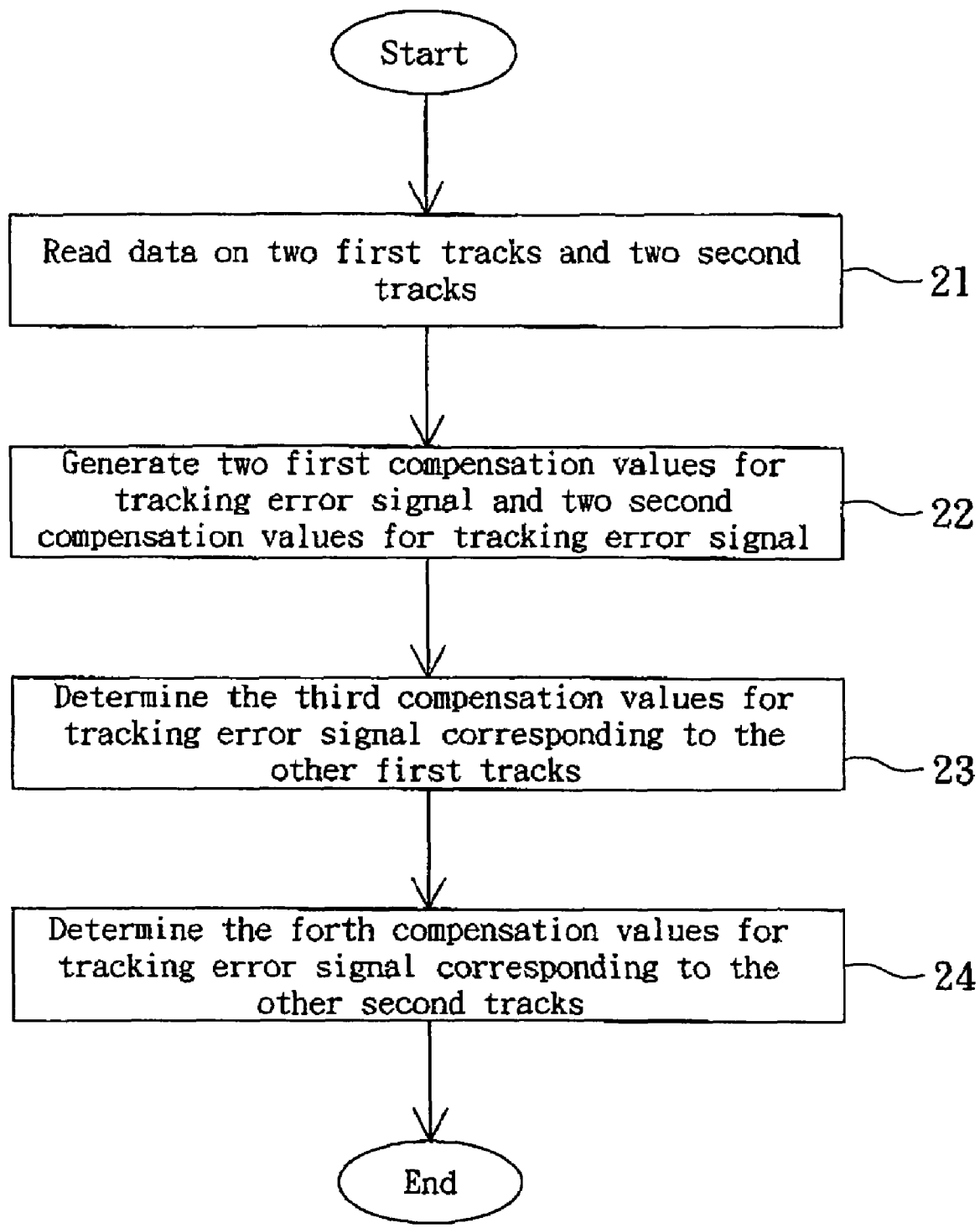
FIG. 3 is a flowchart of the method for determining the compensation value for tracking error signal according to the first embodiment.

Referring to FIG. 3, a flowchart of the method for determining the compensation value for tracking error signal according to the first embodiment is shown. First, in step 21, respectively read data on two first tracks and two second tracks to perform tracking operation when the optical disc drive rotates the DVD 30 at a high or low speed. Next, in step 22, respectively generate two first compensation values for tracking error signal and two second compensation values for tracking error signal by using the optical disc drive. Afterwards, in step 23, determine third compensation values for tracking error signal corresponding to the other first tracks as the DVD 30 is rotated at a high or low speed according to two of the first compensation values for tracking error signal and the positions of the other first tracks relative to two of the first tracks. Afterwards, in step 24, determine forth compensation values for tracking error signal corresponding to the other second tracks as the DVD 30 is rotated at a high or low speed according to two of the second compensation values for tracking error signal and the positions of the other second tracks relative to two of the second tracks. It should be noted that the steps 21 and 22 can be performed simultaneously and the steps 23 and 24 can be performed simultaneously.

Figure 4A:
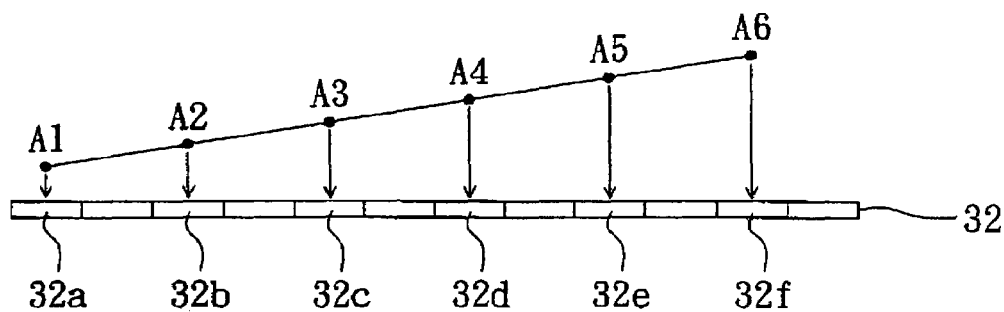
FIG. 4A is a schematic diagram of compensation values for tracking error signal corresponding to the first tracks of the first reflection layer calculated in the method of FIG. 3.

As shown in FIG. 4A, when two of the first tracks to be tracked first are respectively the first tracks 32a and 32f, the first compensation values for tracking error signal corresponding to the first tracks 32a and 32f are A1 and A6, and the value A6 is larger than A1. The optical disc drive calculates the third compensation values A2~A5 for tracking error signal corresponding to the other first tracks 32b~32e by using a first numerical method. For example, the first numerical method is a linear interpolation, and the value A2 is A1+(A6−A1)/5, and the value A5, larger than A2, is A6−(A6−A1)/5. Moreover, the first numerical method can also be a quadratic interpolation method.

When two of the first tracks to be tracked first are respectively the first tracks 32a and 32c, the first track 32c is a middle track between the first tracks 32a and 32f, and the first compensation values for tracking error signal corresponding to the first tracks 32a and 32c are A1 and A3, wherein the value A3 is larger than A1. The optical disc drive calculates the third compensation values A2 for tracking error signal corresponding to the first track 32b between the first tracks 32a and 32c by using a second numerical method. For example, the second numerical method is a linear interpolation, and the value A2 is (A1+A3)/2. Furthermore, the second numerical method can also be a quadratic interpolation method. The optical disc drive will calculate the third compensation values A4~A6 for tracking error signal corresponding to the first tracks 32d and 32e between the first tracks 32c and 32f and the first tracks 32f by using a third numerical method. For example, when the third numerical method is a linear extrapolation, the value A6 is A3+3*(A3−A1)/2. Moreover, the third numerical method can also be a quadratic extrapolation method. Therefore, as long as two of the compensation values for tracking error signal corresponding to any two first tracks of the first reflection layer 32 are known, the compensation values for tracking error signal corresponding to the other first tracks can be calculated by using at least a numerical method according to the invention.

Figure 4B:
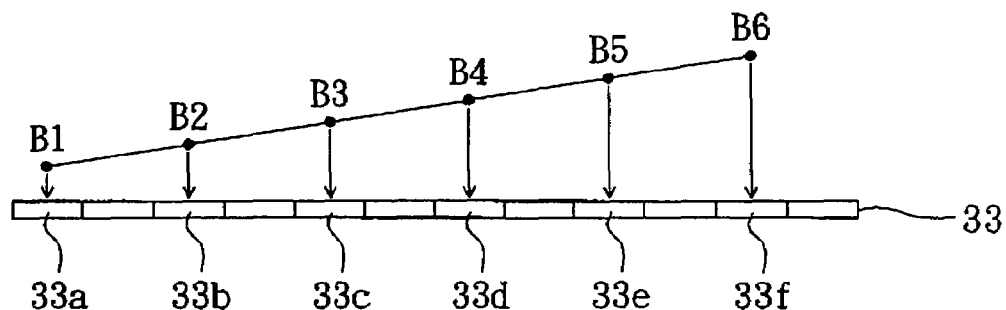
FIG. 4B is a schematic diagram of compensation values for tracking error signal corresponding to the second tracks of the second reflection layer calculated in the method of FIG. 3.

As shown in FIG. 4B, when two of the second tracks to be tracked first are respectively the second tracks 33a and 33f, the second compensation values for tracking error signal corresponding to the second tracks 33a and 33f are B1 and B6, and the value B6 is larger than B1. The optical disc drive calculates the forth compensation values B2~B5 for tracking error signal corresponding to the other second tracks 33b~33e by using a forth numerical method. For example, the forth numerical method is a linear interpolation, and the value B2 is B1+(B6−B1)/5, and the value B5, larger than B2, is B6−(B6−B1)/5. Moreover, the forth numerical method can also be a quadratic interpolation method.

When two of the second tracks to be tracked first are respectively the first tracks 33a and 33c, the second track 33c is a middle track between the first tracks 33a and 33f, and the second compensation values for tracking error signal corresponding to the second tracks 33a and 33c are B1 and B3, wherein the value B3 is larger than B1. The optical disc drive calculates the forth compensation values B2 for tracking error signal corresponding to the second track 33b between the second tracks 33a and 33c by using a fifth numerical method. For example, the fifth numerical method is a linear interpolation, and the value B2 is (B1+B3)/2. Furthermore, the second numerical method can also be a quadratic interpolation method. The optical disc drive will calculate the forth compensation values B4~B6 for tracking error signal corresponding to the second tracks 33d and 33e between the second tracks 33c and 33f and the second tracks 33f by using a sixth numerical method. For example, when the sixth numerical method is a linear extrapolation, the value B6 is B3+3*(B3−B1)/2. Moreover, the sixth numerical method can also be a quadratic extrapolation method. Therefore, as long as two of the compensation values for tracking error signal corresponding to any two second tracks of the second reflection layer 33 are known, the compensation values for tracking error signal corresponding to the other second tracks can be calculated by using at least a numerical method according to the invention.

Embodiment Two

Figure 5:
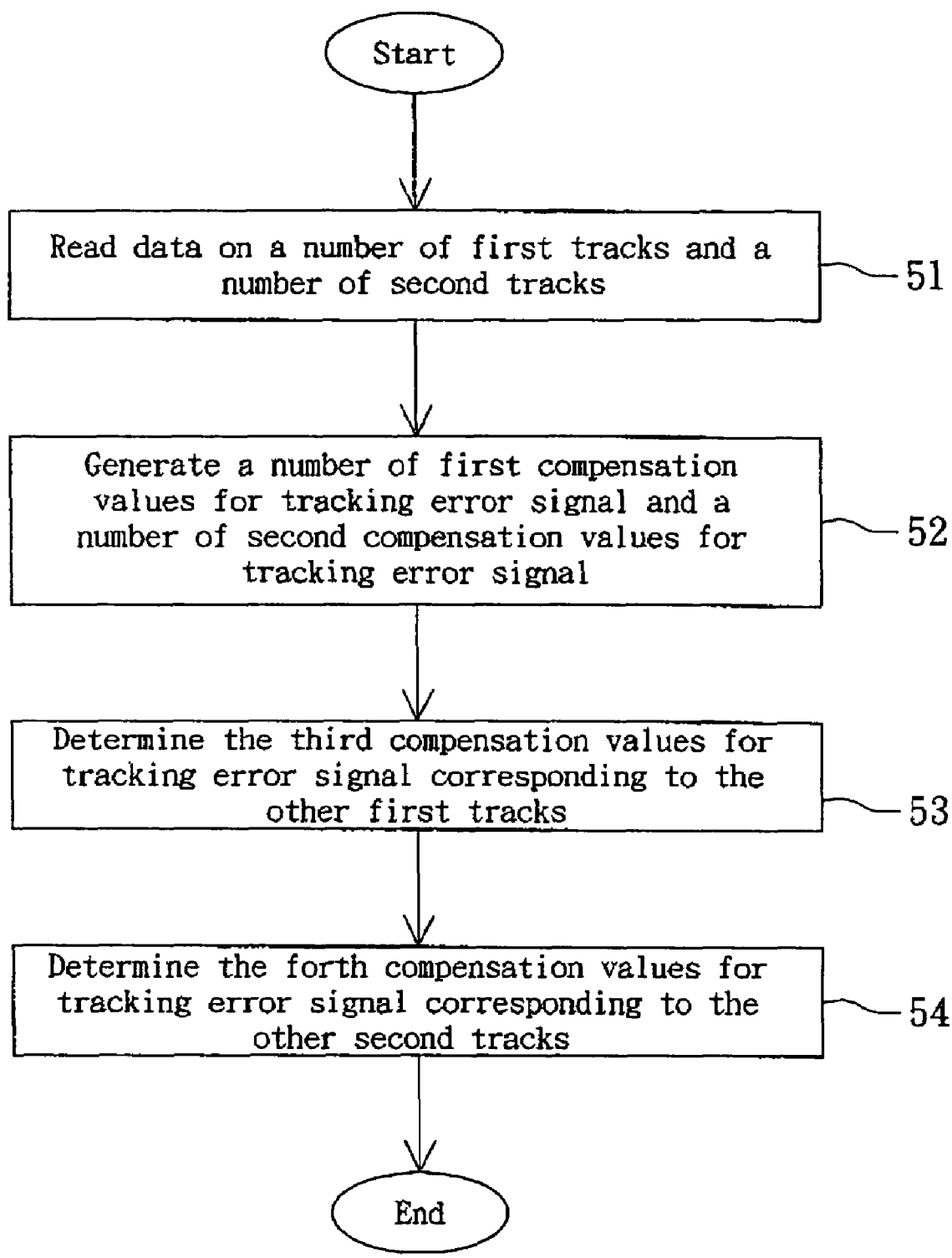
FIG. 5 is a flowchart of the method for determining the compensation value for tracking error signal according to the second embodiment.

Referring to FIG. 5, a flowchart of the method for determining the compensation value for tracking error signal according to the second embodiment is shown. Referring to FIGS. 2A and 2B again, the invention is applied to an optical disc drive for rotating a DVD 30 at some speed and reading data on the DVD 30. The DVD 30 has at least a first reflection layer 32 and a second reflection layer 33. The first reflection layer 32 has M circles of first tracks and the second reflection layer has N circles of second tracks, wherein the values M and N are positive integers, for example, M=N=6.

In FIG. 5, first, in step 51, respectively read data on X first tracks and Y second tracks to perform tracking operation when the optical disc drive rotates the DVD 30 at a high or low speed. Next, in step 52, respectively generate X first compensation values for tracking error signal and Y second compensation values for tracking error signal by using the optical disc drive. The values X and Y are both positive integers larger than 2, and are respectively smaller than the values M and N. For example, X=Y=3. Afterwards, in step 53, determine third compensation values for tracking error signal corresponding to the other first tracks as the DVD 30 is rotated at a high or low speed according to the X first compensation values for tracking error signal and the positions of the other first tracks relative to the X first tracks. Afterwards, in step 54, determine forth compensation values for tracking error signal corresponding to the other second tracks as the DVD 30 is rotated at a high or low speed according to the Y second compensation values for tracking error signal and the positions of the other second tracks relative to the Y second tracks. It should be noted that the steps 51 and 52 can be performed simultaneously and the steps 53 and 54 can be performed simultaneously.

Figure 6A:
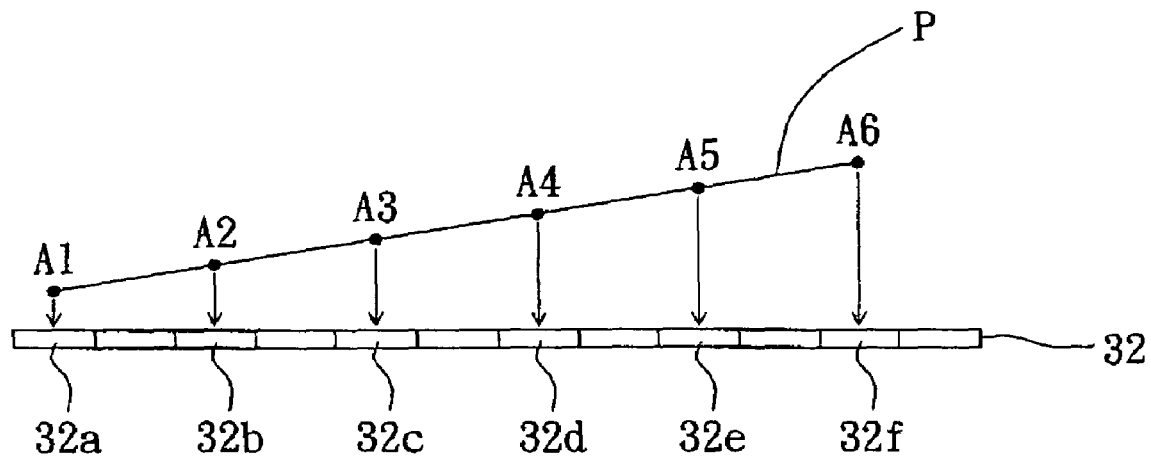
FIG. 6A is a schematic diagram of compensation values for tracking error signal corresponding to the first tracks of the first reflection layer calculated in the method of FIG. 5.

As shown in FIG. 6A, when the X first tracks to be tracked first are respectively the first tracks 32a, 32c, and 32f, the first compensation values for tracking error signal corresponding to the first tracks 32a, 32c and 32f are A1, A3 and A6, and the values A1, A3 and A6 may form a linear or nonlinear function P. The optical disc drive calculates the third compensation values A2, A4 and A5 for tracking error signal corresponding to the first tracks 32b, 32d, and 32e according to the linear or nonlinear function P and the position of each first track. For example, the first numerical method is a linear interpolation, and the value A2 is A1+(A6−A1)/5, and the value A5, larger than A2, is A6−(A6−A1)/5.

Figure 6B:
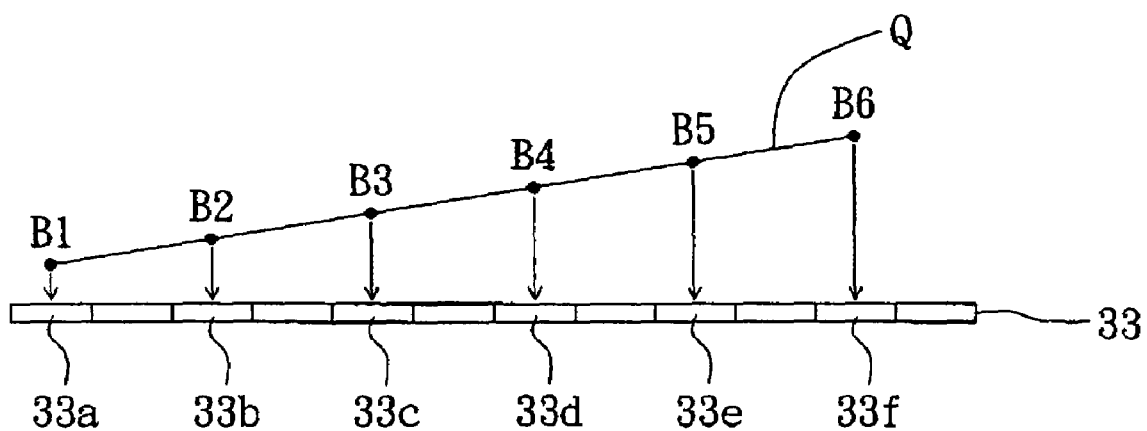
FIG. 6B is a schematic diagram of compensation values for tracking error signal corresponding to the second tracks of the second reflection layer calculated in the method of FIG. 5.

As shown in FIG. 6B, when two of the second tracks to be tracked first are respectively the second tracks 33a, 33c and 33f, the second compensation values for tracking error signal corresponding to the second tracks 33a, 33c and 33f are B1, B3 and B6, and the values B1, B3 and B6 form a linear or nonlinear function Q. The optical disc drive calculates the forth compensation values B2, B4 and B5 for tracking error signal corresponding to the other second tracks 33b, 33d and 33e according to the linear or nonlinear function Q and the position of each second track.

In the method for determining a compensation value for tracking error signal according to the above-mentioned embodiments of the invention, using a numerical method to calculate the compensation value for tracking error signal corresponding to each track of the reflection layers in a DVD, a correct compensation value for tracking error signal corresponding to each track at any rotating speed can be calculated to prevent the optical disc drive from generating incorrect tracking error signals and thus to maintain its good tracking effect.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining a compensation value for tracking error signal, applied in an optical disc drive, the optical disc drive rotating a DVD at a speed and reading data on the DVD, the DVD having a first reflection layer and a second reflection layer, the first reflection layer having a plurality of circles of first tracks, the second reflection layer having a plurality of circles of second tracks, the method comprising:

respectively reading data on two first tracks and two second tracks when the optical disc drive rotates the DVD at the speed, and accordingly generating two first compensation values for tracking error signal and two second compensation values for tracking error signal, wherein two of the first tracks are an innermost track and a middle track located between the innermost track and an outermost track;

determining a third compensation value for tracking error signal corresponding to each of the other first tracks when the optical disc drive rotates the DVD at the speed according to two of the first compensation values for tracking error signal and position of each of the other first tracks relative to two of the first tracks, wherein the third compensation value corresponding to the first tracks between the innermost track and the middle track is calculated by using a first numerical method and the third compensation value corresponding to the first tracks between the outermost track and the middle track is calculated by using a second numerical method; and determining a forth compensation value for tracking error signal corresponding to each of the other second tracks when the optical disc drive rotates the DVD at the speed according to two of the second compensation values for tracking error signal and position of each of the other second tracks relative to two of the second tracks.

2. The method according claim 1, wherein the first numerical method is a linear interpolation method.

3. The method according to claim 1, wherein the first numerical method is a quadratic interpolation method.

4. The method according to claim 1, wherein the second numerical method is a linear extrapolation method.

5. The method according to claim 1, wherein the second numerical method is a quadratic extrapolation method.

6. The method according to claim 1, wherein two of the second tracks are an innermost track and an outermost track, the step of determining the forth compensation values for tracking error signal comprises:

calculating the forth compensation value for tracking error signal corresponding to each of the second tracks other than the innermost track and the outermost track by using a numerical method.

7. The method according to claim 6, wherein the numerical method is a linear interpolation method.

8. The method according to claim 6, wherein the numerical method is a quadratic interpolation method.

9. The method according to claim 1, wherein two of the second tracks are an innermost track and a middle track located between the innermost track and an outermost track, the step of determining the forth compensation value for tracking error signal comprises:

calculating the forth compensation value for tracking error signal corresponding to each of the second tracks between the innermost track and the middle track by using a first numerical method; and calculating the forth compensation values for tracking error signal corresponding to the outermost track and the second tracks between the outermost track and the middle track by using a second numerical method.

10. The method according claim 9, wherein the first numerical method is a linear interpolation method.

11. The method according claim 9, wherein the first numerical method is a quadratic interpolation method.

12. The method according claim 9, wherein the second numerical method is a linear extrapolation method.

13. The method according claim 9, wherein the second numerical method is a quadratic extrapolation method.

* * * * *